(12) United States Patent
Spork

(10) Patent No.: US 10,605,424 B2
(45) Date of Patent: Mar. 31, 2020

(54) LIGHT GUIDE ASSEMBLY FOR DAYTIME RUNNING LAMPS

(71) Applicant: HELLA GmbH & Co. KGaA, Lippstadt (DE)

(72) Inventor: Heinz-Uwe Spork, Westland, MI (US)

(73) Assignee: HELLA GmbH & Co. KGaA, Lippstadt (DE)

( * ) Notice: Subject to any disclaimer, the term of this patent is extended or adjusted under 35 U.S.C. 154(b) by 207 days.

(21) Appl. No.: 15/895,025

(22) Filed: Feb. 13, 2018

(65) Prior Publication Data

US 2019/0249841 A1 Aug. 15, 2019

(51) Int. Cl.

| | |
|---|---|
| *F21S 41/24* | (2018.01) |
| *B60Q 1/18* | (2006.01) |
| *F21S 43/236* | (2018.01) |
| *F21S 41/141* | (2018.01) |
| *F21S 41/29* | (2018.01) |
| *F21S 45/10* | (2018.01) |
| *F21S 43/14* | (2018.01) |
| *F21S 43/27* | (2018.01) |

(52) U.S. Cl.
CPC ............... *F21S 41/24* (2018.01); *B60Q 1/18* (2013.01); *F21S 41/141* (2018.01); *F21S 41/29* (2018.01); *F21S 43/14* (2018.01); *F21S 43/236* (2018.01); *F21S 43/27* (2018.01); *F21S 45/10* (2018.01)

(58) Field of Classification Search
CPC ..... F21V 2200/15; F21S 43/245; F21S 41/24; B60Q 2400/30
See application file for complete search history.

(56) References Cited

U.S. PATENT DOCUMENTS

2018/0029529 A1* 2/2018 Iseki ................. B60Q 1/34

* cited by examiner

*Primary Examiner* — Sean P Gramling
(74) *Attorney, Agent, or Firm* — Warner Norcross + Judd LLP

(57) ABSTRACT

A light guide assembly for a vehicle headlamp is provided. The light guide assembly generally includes a light guide, a retainer defining an elongated channel for the light guide, and a carrier within the retainer and partially surrounding the light guide. The carrier is a standalone component in some embodiments, while in other embodiments the carrier is a layer or a coating on the retainer. The carrier is substantially black and is visible on either side of the light guide to mask a break in the carrier, the break providing an opening for the light guide to enter the headlamp housing. The light guide assembly thereby achieves a consistently-dark border on either side of the light guide along its entire length, even in the location of the housing opening.

19 Claims, 4 Drawing Sheets

10,605,424 B2

LIGHT GUIDE ASSEMBLY FOR DAYTIME RUNNING LAMPS

BACKGROUND OF THE INVENTION

The present invention generally pertains to light guide assemblies for daytime running lamps in automotive headlamps and other applications.

Most vehicle manufacturers now include daytime running lamps as a standard feature on production vehicles. For some vehicle models, daytime running lamps comprise a light guide coupled to an LED module. The light guide can include an elongated strip that is integrated into the headlamp assembly to increase the visibility of the vehicle during daylight conditions and lowlight conditions. The light guide also offers styling advantages over conventional daytime running lamps with minimal power consumption, particularly where LEDs are utilized.

Known light guide assemblies include a white retainer behind the light guide. The white retainer ensures the light guide is properly positioned within the headlamp housing, while also providing a brighter appearance over light guide assemblies having black retainers. The white retainer and the light guide enter the protective lamp housing through a small opening. This opening is not visible when the vehicle is running, e.g., when the daytime running lamp is on. In unlit conditions, however, the opening is visible as a black hole in the interior of the headlamp.

It would therefore be beneficial to provide an improved light guide assembly which optically masks the opening through which the light guide enters the headlamp housing. In particular, it would be beneficial to provide an improved light guide assembly that provides a consistent appearance along the entirety of its length for both lit and unlit conditions.

SUMMARY OF THE INVENTION

A light guide assembly for a vehicle headlamp is provided. The light guide assembly generally includes a light guide, a retainer defining an elongated channel for the light guide, and a carrier within the retainer and partially surrounding the light guide. The carrier is a standalone component in some embodiments, while in other embodiments the carrier is a substrate or a coating. The carrier is substantially black and is visible on either side of the light guide to mask a break in the retainer, the break providing an opening for the light guide to enter the headlamp housing. The light guide assembly thereby achieves a consistently-dark border on either side of the light guide along its entire length, even in the location of the housing opening.

In one embodiment, the light guide assembly includes a light guide, a retainer, a carrier, and a protective lens. The light guide is optically coupled to an LED light module and protrudes through an opening in a headlamp housing. The retainer is shaped to route the light guide through the headlamp housing and defines an elongated channel with opposing sidewalls that are substantially white in color. The carrier is substantially black in color and is disposed in the channel between the light guide and the channel sidewalls, such that the carrier is visible on both sides of the light guide as a dark border. The protective lens is disposed over the light guide and is fixedly coupled to the retainer sidewalls to enclose the light guide therebetween, the protective lens being at least partially light transmissive.

Accordingly, embodiments of the invention can provide an enhanced optical appearance for light guides for daytime running lamps, even in low light conditions, with minimal added manufacturing costs as compared to existing light guide assemblies. Though described herein as pertaining to daytime running lamps, the light guide assembly of the present invention can additionally be implemented in other applications, for example interior vehicle lighting. These and other advantages and features of the invention will be more fully understood and appreciated by reference to the drawings and the description of the current embodiments.

DESCRIPTION OF THE CURRENT EMBODIMENT

Figure 1:
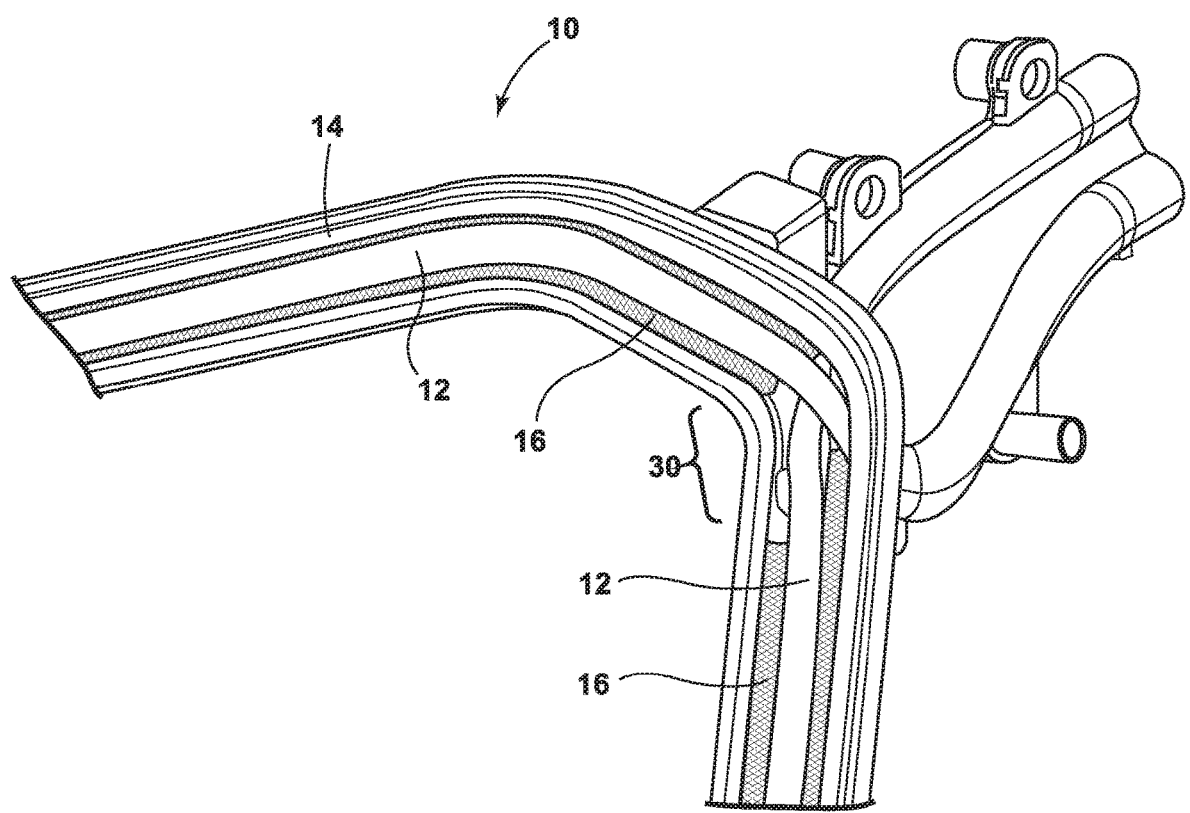
FIG. 1 includes a first perspective view of a light guide assembly in accordance with a current embodiment.
Figure 2:
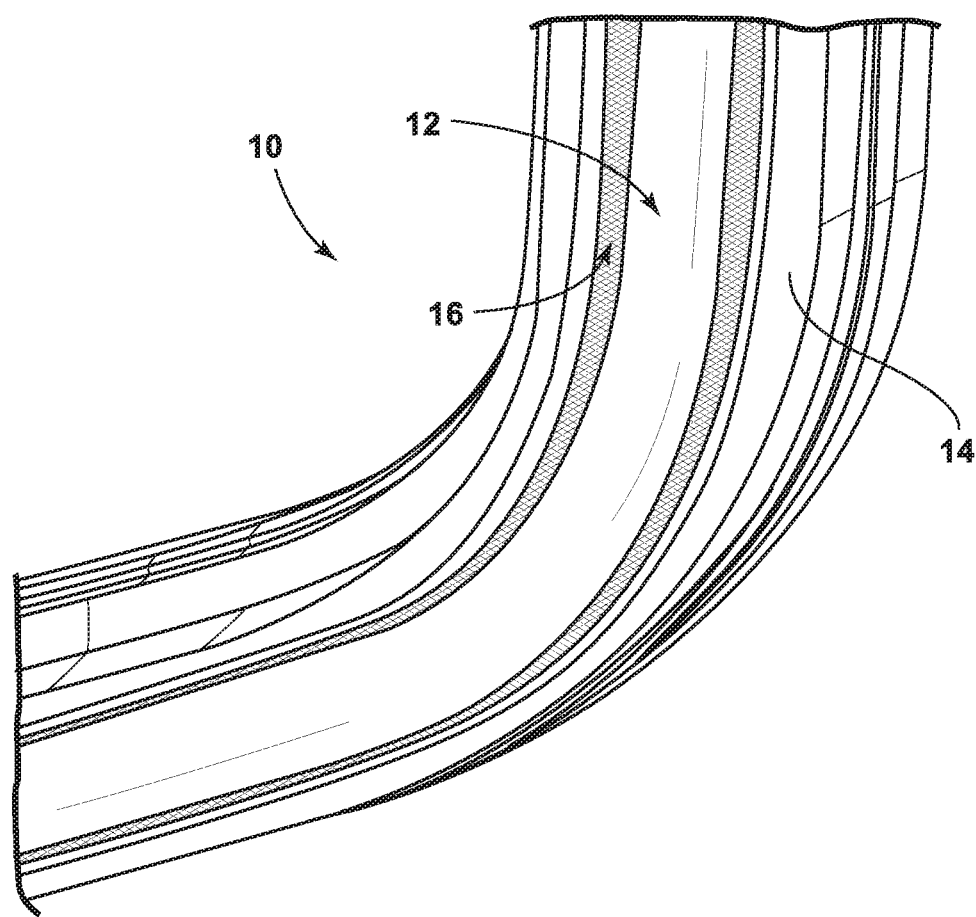
FIG. 2 includes a second perspective view of the light guide assembly in accordance with a current embodiment.

A light guide assembly in accordance with a current embodiment is depicted in FIGS. 1-4 and generally designated 10. The light guide assembly 10 includes a light guide 12, a retainer 14, a carrier 16, and a protective lens 20. The light guide 12 is optically coupled to a light source and protrudes through an opening in a headlamp housing. The retainer 14, the carrier 16, and the protective lens 18 form an elongated enclosure for the light guide 12 and disguise the opening in the headlamp housing. Each feature of the light guide assembly 10 is discussed below.

The light guide 12 generally includes an elongated body that is adapted to radiate light along all or a substantial portion of its length. The light guide 12 is generally a secondary light source within a headlamp housing, the primary light source being a forward-illuminating high-beam/low-beam lamp. The light guide 12 can include a variety of configurations, including for example the elongated, curvilinear light pipe shown in FIG. 1. In this embodiment, the light guide 12 is optically coupled to a suitable light source, for example an LED light module, and is formed from a transparent material. LED light is guided therein by successive internal reflections, and the light guide 12 can include a plurality of internal facetted surface areas to create a uniform light distribution of LED light. Light from the LED light module, when activated, propagates through the light guide 12, which radiates light forwardly from the headlamp housing as a daytime running lamp in the current embodiment. The headlamp can additionally include an outer protective lens (different from the protective lens 18 of the light guide assembly 10) to encapsulate the primary and secondary light sources therein.

Figure 4:
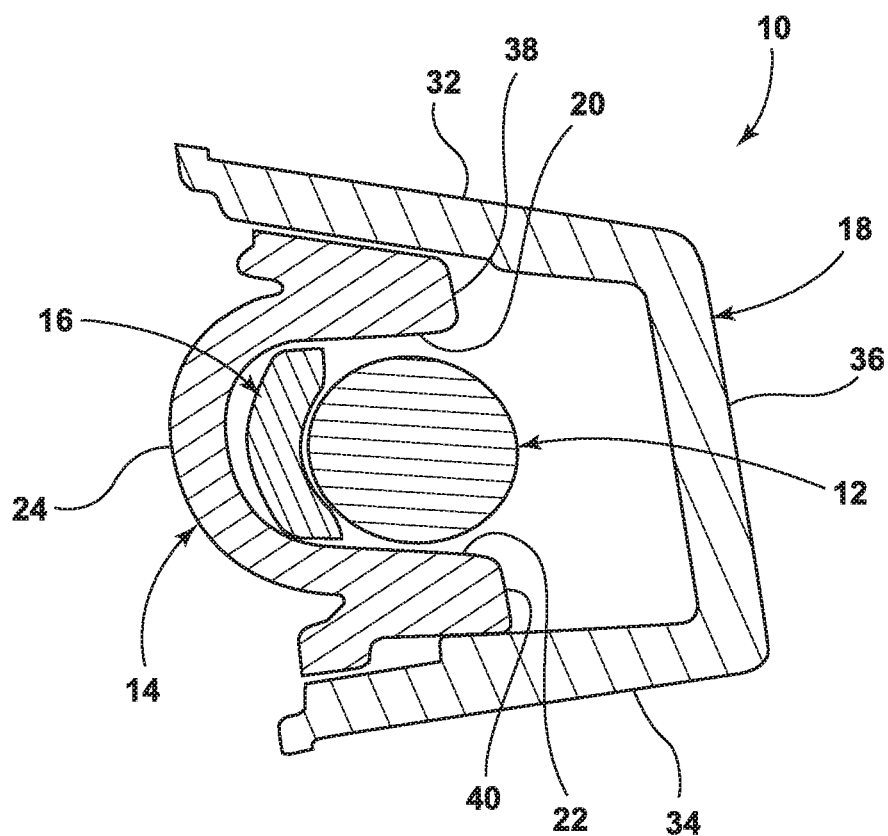
FIG. 4 includes a cross-sectional view of the light guide assembly of FIG. 1.

The retainer 14 is shaped to route the light guide 12 through the headlamp housing and extends longitudinally along the exposed length of the light guide 12. The retainer includes a c-shaped cross section and defines a channel for the light guide 12. The channel includes opposing sidewalls 20, 22 and an intermediate portion 24 that is rearward of the light guide 12. As best shown in FIG. 4, the sidewalls 20, 22 are spaced apart from each other by a distance that is greater than the diameter of the light guide 12. Consequently, a gap exists on both sides of the light guide 12 such that the dark carrier 16 is visible on both sides of the light guide 12.

Figure 3:
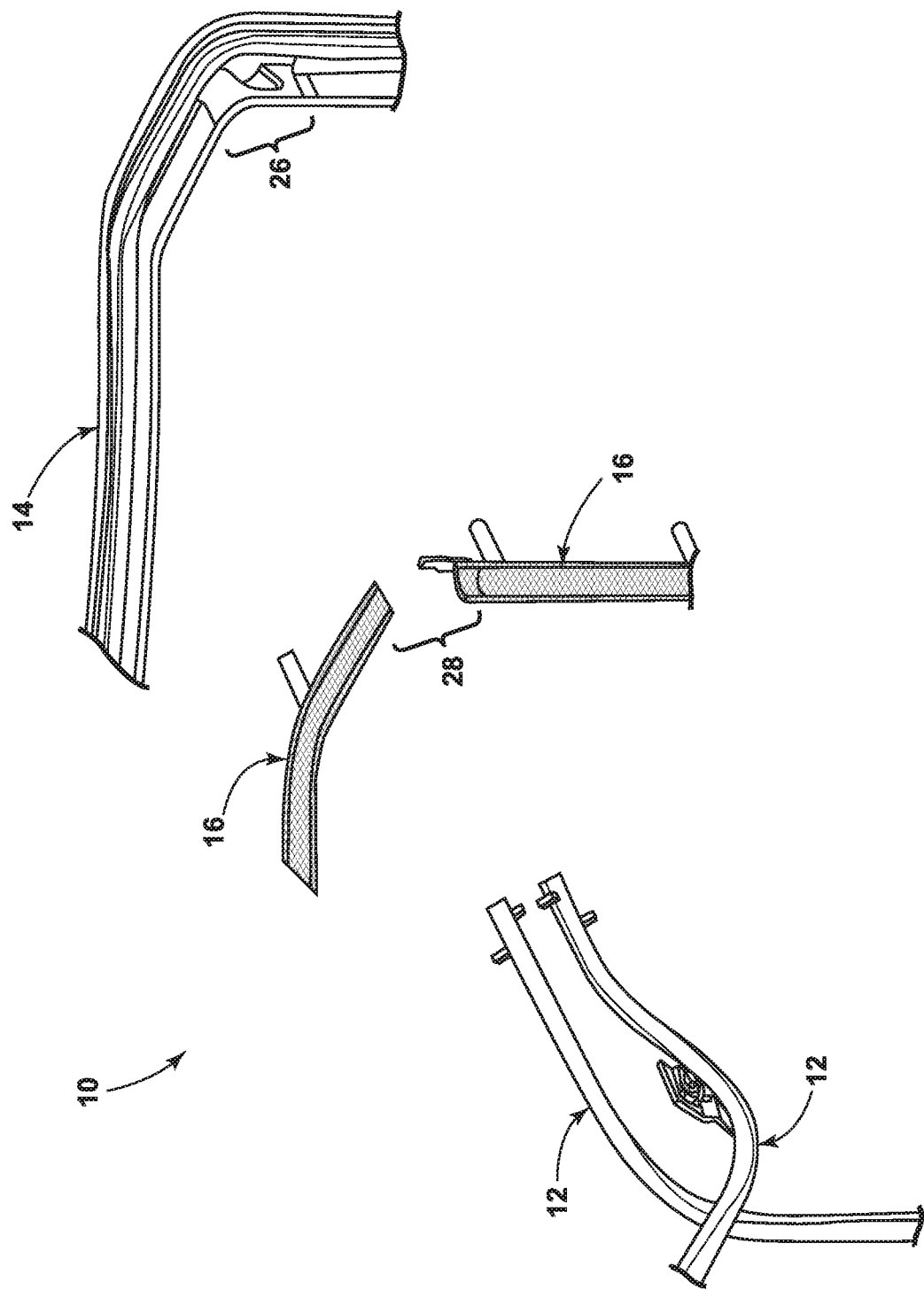
FIG. 3 includes an exploded view of the light guide assembly of FIG. 1.

Referring now to FIG. 3, the retainer 14 includes a region in which its intermediate portion 24 is omitted, thereby forming a break or opening 26 in the retainer 14. The carrier 16 also terminates at a break or opening 28 that is coextensive with the break or opening 26 in the retainer 14. This portion of the light guide retainer 10 comprises a through-hole 30 (shown in FIG. 1) for passage of the light guide 12. The sidewalls 20, 22 of the retainer 14 continue, uninterrupted, on either side of this through-hole 30. The through-hole 30 provides a black background that is disguised by the substantially black carrier 16 surrounding the light guide 12. In particular, the carrier 16 is visible on either side of the light guide 12, presenting the appearance of continuous dark outline to the light guide, even at the through-hole 30.

In the illustrated embodiment, the carrier 16 is a stand-alone component that is sandwiched between the concave inner surface of the retainer 14 and the light guide 12, optionally being secured thereto using an adhesive. In other embodiments, the carrier 16 includes a thin substrate that is substantially black in color and that is adhesively bonded to the concave inner surface of the retainer 14. In still other embodiments, the carrier 16 includes an optical coating that is substantially black in color, the optical coating being applied to the concave inner surface of the retainer 14. The carrier 16 is coextensive in length with the retainer 14 (except in the region of the through-hole 30) and includes a width that is greater than the diameter of the light guide 12 but less than the distance separating the first sidewall 20 from the second sidewall 22.

As noted above, the light guide retainer 10 also includes a protective lens 18. The protective lens 18 wraps around the light guide 12 and snap fits with the retainer 14. In particular, the protective lens 18 includes opposing side portions 32, 34 and a central portion 36. The interior-facing surfaces of the opposing side portions 32, 34 are separated by a distance generally equal to the distance separating the exterior-facing surfaces of the sidewalls 20, 22. The protective lens 18 is transparent and colorless in the current embodiment, while in other embodiments the protective lens 18 is translucent and/or colored. In other embodiments the protective lens 18 is omitted, and the light guide assembly 10 includes only the light guide 12, the retainer 14, and the carrier 16.

FIG. 4 depicts a cross section of the light guide assembly 10 and demonstrates the relationship between the light guide 12, the retainer 14, the carrier 16, and the optional protective lens 18. In particular, the carrier 16 is positioned behind the light guide 12 and extends partially around the light guide 12, such that the carrier 16 forms a dark border above and below the light guide 12. As noted above, the carrier 16 can be a standalone component, a coating, or a substrate, for example. The light guide 12 and the carrier 16 are contained with the retainer 14, which is generally white or light in color and which routes the light guide 12 through the headlamp housing. The protective lens 18 snap fits over the retainer 14 to define a protective enclosure for the light guide 12. The protective lens 36 is transparent and colorless and extends continuously along the length of the retainer 14, including over the through-hole 30 depicted in FIG. 1 above.

In operation, the light guide 12 emits light along the entirety of the length of the light guide assembly 10. The retainer 14, and in particular the exposed end faces 38, 40 of the retainer sidewalls 20, 22, is substantially white or light colored to enhance the optical output of the light guide assembly 10. The carrier 16 is substantially black or dark colored to eliminate any optical contrast with the through-hole 30. Consequently, the through-hole 30 is invisible to the casual observer and is only apparent with a close visual inspection of the headlamp assembly. The light guide assembly 10 thereby achieves a consistently-dark border on either side of the light guide along its entire length, even in the location of the housing opening, in both lit and un-lit conditions. While described in relation to a headlamp assembly, the light guide assembly 10 can additionally be implemented in other applications for light guides, for example other exterior vehicle lighting applications and interior vehicle lighting applications.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A light guide assembly for a vehicle headlamp having a light module, the light guide assembly comprising:
    a light guide coupled to the light module, the light guide having an elongated body that is adapted to radiate light generated by the light module along the longitudinal expanse of the elongated body;
    a retainer defining an elongated channel to receive the light guide therein, the elongated channel including first and second sidewalls that extend in a lengthwise direction on opposing sides of the light guide, the first and second sidewalls being substantially white in color, wherein the retainer includes a curved interior surface defining a retainer opening, the light guide extending through the retainer opening; and
    a carrier defining an elongated seat for the light guide, the carrier being visible between the light guide and the first and second retainer sidewalls and being substantially black in color to mask the retainer opening when the light guide is not illuminated.

2. The light guide assembly of claim 1 further including a protective lens disposed over the light guide and fixedly coupled to the retainer to enclose the light guide therebetween, the protective lens being at least partially transmissive to light radiated by the light guide.

3. The light guide assembly of claim 1 wherein the carrier is a rigid component that is attached to a curved interior surface of the retainer.

4. The light guide assembly of claim 1 wherein the carrier is a substrate that is bonded to a curved interior surface of the retainer.

5. The light guide assembly of claim 1 wherein the carrier is a coating applied to a curved interior surface of the retainer.

6. The light guide assembly of claim 1 wherein the carrier includes a first portion spaced apart from a second portion on respective first and second sides of the retainer opening.

7. The light guide assembly of claim 1 wherein the first and second retainer sidewalls extend parallel to the retainer opening.

8. The light guide assembly of claim 1 wherein the carrier includes a width that is greater than the diameter of the light guide and less than a distance separating the first retainer sidewall from the second retainer sidewall.

9. The light guide assembly of claim 1 wherein the protective lens snap fits over the first and second retainer sidewalls.

10. A light guide assembly comprising:
a light guide having an elongated body that is adapted to radiate light along the longitudinal expanse of the elongated body;
a retainer defining an elongated channel to receive the light guide therein, the elongated channel including first and second sidewalls and an intermediate portion therebetween, the intermediate portion defining a retainer opening for passage of the light guide therethrough;
a carrier between the retainer and the light guide, the carrier including a first portion spaced apart from a second portion on respective first and second sides of the retainer opening; and
a protective lens disposed over the light guide and fixedly coupled to the first and second sidewalls to enclose the light guide,
wherein the first and second sidewalls are substantially white in color and wherein the carrier is substantially black in color, the carrier being visible between the light guide and the first and second retainer sidewalls to mask the retainer opening when the light guide is not illuminated.

11. The light guide assembly of claim 10 wherein the carrier is a rigid component that is attached to the intermediate portion of the retainer.

12. The light guide assembly of claim 10 wherein the carrier is a substrate that is bonded to the intermediate portion of the retainer.

13. The light guide assembly of claim 10 wherein the carrier is a coating applied to the intermediate portion of the retainer.

14. The light guide assembly of claim 10 wherein the carrier includes a width that is greater than the diameter of the light guide and less than a distance separating the first retainer sidewall from the second retainer sidewall.

15. A light guide assembly comprising:
a light guide having an elongated body that is adapted to radiate light along the longitudinal expanse of the elongated body;
a retainer defining an elongated channel to receive the light guide therein, the retainer including first and second sidewalls and an intermediate defining a retainer opening for passage of the light guide therethrough, the first and second sidewalls extending on opposing sides of the retainer opening and being substantially white in color; and
a carrier interposed between the retainer and the light guide, the carrier including a first portion spaced apart from a second portion on respective first and second sides of the retainer opening, at least a portion of the carrier being visible between the light guide and each of the first and second retainer sidewalls to mask the retainer opening when the light guide is not illuminated.

16. The light guide assembly of claim 15 further including a protective lens disposed over the light guide and fixedly coupled to the first and second sidewalls to enclose the light guide.

17. The light guide assembly of claim 15 wherein the carrier is a rigid component that is attached to the intermediate portion of the retainer.

18. The light guide assembly of claim 15 wherein the carrier is a substrate that is bonded to the intermediate portion of the retainer.

19. The light guide assembly of claim 15 wherein the carrier is a coating applied to the intermediate portion of the retainer.

* * * * *